Sept. 25, 1928. 1,685,315
D. T. DAY
PROCESS OF EXTRACTING THE OILY BASES FROM CRUDE SHALE OIL
Filed Dec. 11, 1924
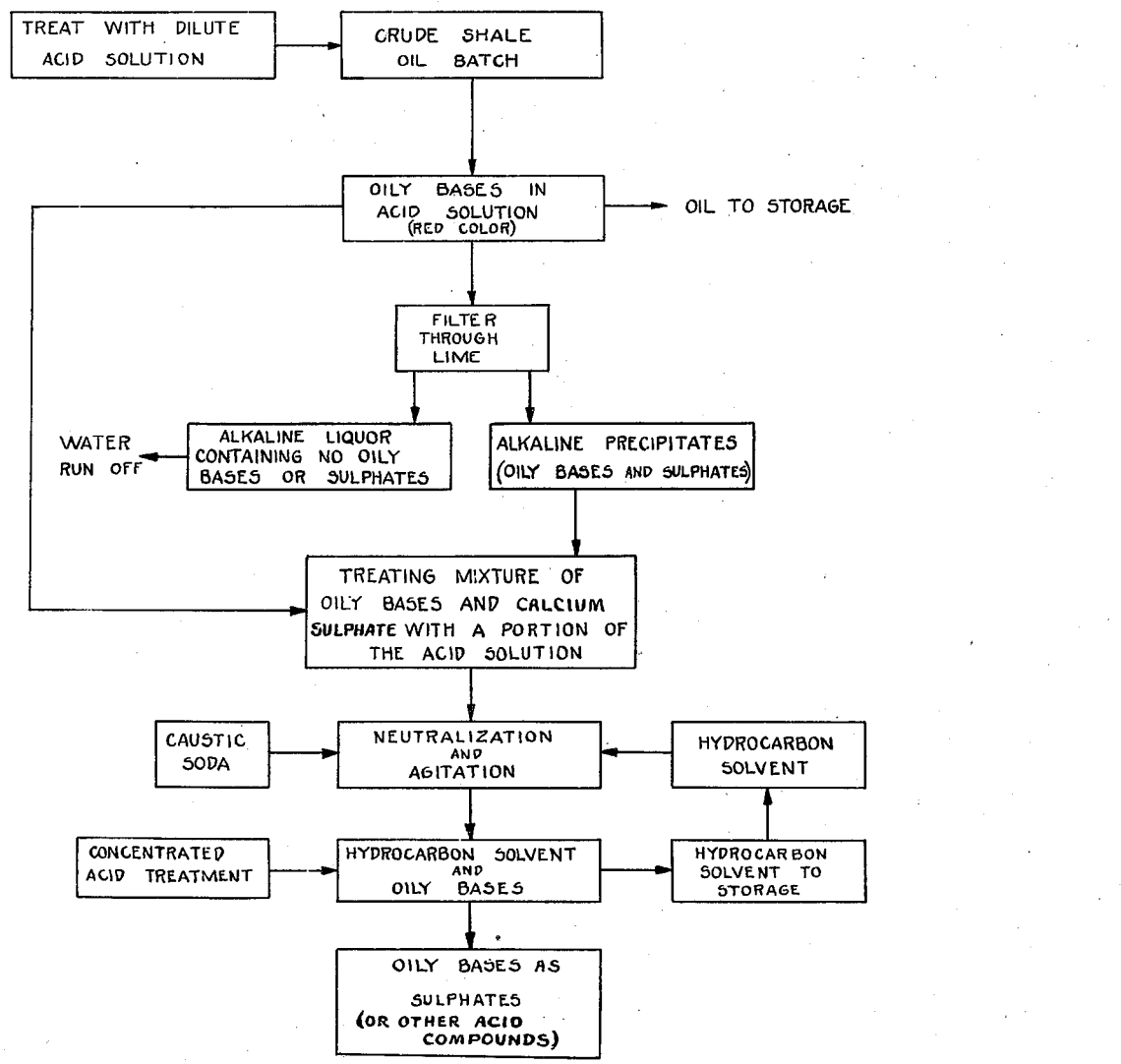

Patented Sept. 25, 1928.

1,685,315

UNITED STATES PATENT OFFICE.

DAVID T. DAY, OF WASHINGTON, DISTRICT OF COLUMBIA; FRED J. GOBLE ADMINISTRATOR OF SAID DAVID T. DAY, DECEASED.

PROCESS OF EXTRACTING THE OILY BASES FROM CRUDE SHALE OIL.

Application filed December 11, 1924. Serial No. 755,316.

This invention relates to a new and useful process for the treatment of crude shale oil, and particularly contemplates a process for the extraction of the oily bases from crude shale oil by treating such oil with an acid which dissolves the oily bases.

It is clearly recognized that shale oil will yield products which are different from, but not necessarily inferior to, the corresponding products from ordinary petroleum. It has been found that the various methods used for refining petroleum oils cannot be used in a process for extracting the oily bases from crude shale oil.

According to previously known methods of oil refining and treating, as distinguished from the treatment of shale oil, it has been customary to treat the oils subsequent to their distillation with concentrated or fuming sulphuric acid. Other methods have also been disclosed for the refining of petroleum oils wherein the initial step consists in treating the oil with concentrated sulphuric acid. These treatments, however, have always been confined to the petroleum oils and therefore are not in any way similar to the process now disclosed.

The invention particularly contemplates a process which will effectually and economically remove practically all of the oily bases from crude shale oil and consists in extracting the oily bases in the form of sulphates or in combination with other acids by agitating the oil with the desired acid.

The invention resides in the process to be more fully described hereinafter and the novelty of which will be particularly pointed out and claimed.

The accompanying drawing shows a chart illustrating the steps and procedure in treating a batch of crude shale oil to derive the desired products.

In carrying out the process in its preferred form, a quantity of crude shale oil is first treated with a dilute acid solution, preferably a dilute solution of sulphuric acid, to effect a separation of the oily bases from the oil. The dilute acid solution is used in such a quantity as to give a resulting solution containing the oily bases of approximately ten per cent of the original volume of crude shale oil. The next step consists in drawing off the acid solution from the oil, such acid solution containing practically all of the oily bases originally in the oil. A portion of this acid solution may be held in storage for further use in other steps in the same process. After the separation of the acid solution and the oily bases from the oil, the oil may be returned to a suitable storage vessel and used for any purpose desired. When sulphuric acid was used in the process a characteristic red color was observed for the acid solution, produced after the treatment of the crude shale oil with the acid. The acid solution and the oily bases are now neutralized with an alkali, preferably lime, by causing the solution to filter through a bed of the alkali or the alkali may be introduced into the solution and after such neutralization, the water originally contained in the dilute acid solution is removed by drawing it off.

The result of this neutralization is an alkaline precipitate which contains the oily bases and the insoluble sulphates, usually calcium sulphate and other sulphates adventitiously present in the solution. The next step consists in treating the precepitated bases with a small portion of the acid solution from storage. One reason for using a portion of this acid solution is because it is already available in such large quantities. Another reason is that it is cheaper to use a portion of this original acid solution than it is to use an entirely new portion of acid that has not been used in previous steps in the process. Of course, it is also possible to use an entirely new acid for this step in the process. After treatment with a portion of the original acid solution, the solution is again filtered through the bed of alkali or the original bed of alkali may be supplemented with some fresh material. This acid treatment has the effect of redissolving the precipitated bases into a relatively strong solution, and is equivalent to a resolution of the precipitated bases in a small quantity of the original acid solution. At this step in the process any oil is eliminated which has been carried over by the original acid solution and held in suspension. Neutralization is completed by adding caustic soda to the acid filtrate solution. This step is preferably effected while agitating the mixture with a hydrocarbon solvent, such as gasoline or casing-head gasoline which should be as free as possible from the unsaturated compounds. The resultant solution containing the oily bases is removed from the alkaline aqueous solution by decantation or otherwise. The hydrocarbon solvent containing the oily bases and comprising the resultant solution is now in the proper condition for the final treatment which consists in treating the hydrocarbon solution and bases with a small amount of an acid which removes the oily bases. The solvent is then removed and returned to storage for re-use.

It should be noted that no large amount of acid is necessary as many successful experiments with this process have shown that if the acid additions are small, the extraction is very complete. Sulphuric acid is most generally used, although hydrochloric acid may be used equally as well. If the former acid is used, the oily bases are extracted in the form of strong sulphates. When other acids are used, the extracted products are drawn off in the form of acid compounds of these bases. No further treatment is necessary, and the extracted products are now in condition for the market, and may be used as insecticides particularly in the form of a nicotine sulphate insecticide.

I claim:

1. The process of extracting the oily bases from crude shale oil which process consists in first treating a body of the crude shale oil with a dilute inorganic acid solution, separating the acid solution containing the oily bases from the oil, neutralizing with an alkali to effect a precipitation of the oily bases and other bases from the acid solution, collecting the oily bases apart from the resultant alkaline solution, treating the precipitated bases with an inorganic acid, neutralizing the resultant mixture with an alkali, agitating said mixture with a hydrocarbon solvent, drawing off the resultant solution from the alkaline aqueous solution, and extracting the oily bases from said resultant solution with an inorganic acid used as the extracting medium.

2. The process of extracting the oily bases from crude shale oil which process consists in first treating a body of the crude shale oil with a dilute inorganic acid solution, separating the acid solution containing the oily bases from the oil, neutralizing with an alkali to effect a precipitation of the oily bases and other bases from the acid solution, collecting the oily bases apart from the resultant alkaline solution, treating the precipiated bases with a portion of said original acid solution containing the oily bases, neutralizing the resultant mixture with an alkali, agitating the resulting precipitate with a hydrocarbon solvent, drawing off the resultant solution from the alkaline aqueous solution, and extracting the oily bases from said resultant solution with an inorganic acid used as the extracting medium.

3. The process of extracting the oily bases form crude shale oil which process consists in first treating a body of the crude shale oil with a dilute sulphuric acid solution, separating the acid solution containing the oily bases from the oil, neutralizing with an alkali to effect a precipitation of the oily bases and other bases from the acid solution, collecting the oily bases apart from the resultant alkaline solution, treating the precipitated bases with a portion of said original acid solution containing the oily bases, neutralizing the resultant mixture with an alkali, agitating the resulting precipitate with a hydrocarbon solvent, drawing off the resultant solution from the alkaline aqueous solution, and extracting the oily bases from said resultant solution with sulphuric acid used as the extracting medium.

4. The process of extracting the oily bases from crude shale oil which process consists in first treating a body of the crude shale oil with a dilute sulphuric acid solution, separating the acid solution containing the oily bases from the oil, neutralizing with lime to effect a precipitation of the oily bases and other bases from the acid solution, collecting the oily bases apart from the resultant alkaline solution, treating the precipitated bases with a portion of said original acid solution containing the oily bases, neutralizing the resultant mixture with caustic soda, agitating the resulting precipitate with casing-head gasoline, drawing off the resultant solution from the alkaline aqueous solution, and extracting the oily bases from said resultant solution with sulphuric acid used as the extracting medium.

5. The process of extracting the oily bases from hydrocarbon oil material distilled from oil bearing earthy material which process consists in first treating a body of the said hydrocarbon oil material with a dilute inorganic acid solution, separating the acid solution containing the oily bases from the hydrocarbon oil material, neutralizing with an alkali to effect a precipitation of the oily bases and other bases from the acid solution, collecting the oily bases apart from the resultant alkaline solution, treating the precipitated bases with an inorganic acid, neutralizing the resultant mixture with an alkali, agitating said mixture with a hydrocarbon solvent, drawing off the resultant solution from the alkaline aqueous solution, and extracting the oily bases from said resultant solution with an inorganic acid used as the extracting medium.

6. The process of extracting the oily bases from hydrocarbon oil material distilled from oil bearing earthy material which process consists in first treating a body of the said hydrocarbon oil material with a dilute sulphuric acid solution, separating the acid solution containing the oily bases from the hydrocarbon oil material, neutralizing with lime to effect a precipitation of the oily bases and other bases from the acid solution, collecting the oily bases apart from the resultant alkaline solution, treating the precipitated bases with a portion of said original acid solution containing the oily bases, neutralizing the resultant mixture with caustic soda, agitating the resultant precipitate with casing-head gasoline, drawing off the resultant solution from the alkaline aqueous solution, and extracting the oily bases from said resultant solution in the form of sulphates with sulphuric acid used as the extracting medium.

In testimony whereof I affix my signature.

DAVID T. DAY.